UNITED STATES PATENT OFFICE.

TORU ISHIGAMI, OF OSAKA, JAPAN.

TUBERCULO-TOXOIDIN.

1,020,761. Specification of Letters Patent. Patented Mar. 19, 1912.

No Drawing. Application filed January 7, 1907. Serial No. 351,128.

*To all whom it may concern:*

Be it known that I, TORU ISHIGAMI, a subject of the Emperor of Japan, and residing at Osaka, Empire of Japan, have made a certain new and useful Invention in Tuberculo-Toxoidin, of which the following is a specification.

This invention relates to tuberculo-toxoidin and method of making the same.

The object of the invention is to produce an efficient remedy for tuberculosis.

A further object is to produce from tubercle bacilli, a remedy for tuberculosis which is free from noxious or virulent toxin.

A further object is to eliminate the noxious or virulent toxin from tubercle bacilli and to extract the remaining toxin and convert the same into a product for use in treating tuberculosis.

Other objects of the invention will appear more fully hereinafter.

The invention consists substantially in the mode of operation and the resulting product, as will be more fully set forth hereinafter and pointed out in the appended claims.

It is a recognized fact that animals inoculated with dead tubercle bacilli, or with preparations made therefrom, are thereby given, or have imparted to them, a preventative power against the living bacilli, and that when animals are attacked by tuberculosis, they may be cured, to a certain extent, at least, when treated with such preparations, and it is also known that human beings, suffering in like manner from tuberculosis may, by similar treatment, be also cured. It is also known that the tubercle bacilli contain toxins which are of a noxious and virulent character, and which, when contained in preparations of the character referred to and injected into the body of a patient, not only produce serious local irritation at the point where the injection is made, but also cause serious and dangerous side reactions, such as a high temperature, in the patient being treated, and consequently the use of such preparations is not only attended with grave danger, but they fail in the accomplishment of their intended objects and effects.

It is among the special purposes of my present invention to so treat tubercle bacilli as to remove and eliminate therefrom the noxious or virulent toxins, leaving the remaining and non-virulent toxins to be treated and converted into a product and recovered for use in treating tuberculosis, and hence avoiding the objections and difficulties of local irritation and side reactions heretofore encountered in the use of preparations of this nature.

As a suitable and preferable material for preparing my product, the tubercle bacilli of man are used, that is to say, the bacilli found in expectoration of a tuberculous patient are separated out and cultivated upon suitable media, in a well known manner. The cultivation of the bacilli forms no part of my present invention. I will describe however, a convenient method of propagation, which, when carried to the desired stage, as, for instance, to the fourth or fifth, and, if desired on up to the thirteenth generation or reproduction of the bacilli, produces a material which is very energetic in its virulency, and which I employ, as hereinafter described, in the production of my product. A culture medium suitable for use in the cultivation of the bacilli is in the form of a nutrient broth made from an extract of the flesh of animals susceptible to the human tuberculosis, such as guinea-pigs or rabbits, according to the following formula:—

Flesh of rabbits or guinea-pigs __ 500 grams
Water _____ 1,000 cubic centimeters
Peptone _____ 10 grams
Sodium chlorid _____ 5 grams
Glycerin, pure _____ 50 cubic centimeters The use of the flesh of the animals susceptible to the human tuberculosis produces a toxin more efficient in immunizing quality than that produced on other kinds of animal flesh.

The bacilli are cultivated in suitable vessels into which the nutrient broth, properly infected with the bacilli, is introduced, the culture vessels containing the broth being placed in an incubator where they are maintained at a temperature ranging from 37° to 38° centigrade for a period ranging from three to five weeks, at the end of which time the bacilli may be collected into a mass in any suitable or convenient manner, and separated from the culture medium, as, for instance, by straining the contents of the culture vessels through a cloth, the mass of bacilli remaining on the cloth while the fluid drains through.

In carrying out my invention I subject the pure culture of tubercle bacilli to a vigorous trituration in a mortar or other suitable receptacle, and to the crushed mass I add a large quantity of water. The proportion of water to the mass may vary throughout a wide range. I have found that 5000 cubic centimeters of water to 100 grams of the mass is a suitable proportion. I then put the vessel aside to permit the crushed bacilli to steep in the water. The toxins of virulent character contained in the bacilli cell are readily soluble in water, and therefore, by triturating the bacilli the cells are crushed and the water is enabled to reach and dissolve these noxious toxins, thereby enabling them to be removed in large part leaving the residue much reduced in virulent property. From time to time usually after periods of about six hours each the supernatant water is removed and the residual mass is shaken up with a fresh supply of water added thereto. By thus repeatedly drawing off the supernatant water and adding fresh quantities, as noted, the virulent toxins are gradually dissolved and removed, leaving the residue comparatively free of the toxins possessing virulent properties. This residue, composed largely of the cell structure of the bacilli, is then filtered or drained and collected and then thoroughly dried.

The drying operation may be carried out in many specifically different ways. I have found it efficient to retain the mass in an incubator and at a temperature of 37° to 38° centigrade for several days in order to insure a thorough drying. The mass may then be again subjected to repeated washings with sterilized water, the bacilli being allowed each time to settle down and the supernatant liquid being drawn off and fresh quantities of water added and the mass well shaken up. This manipulation may be continued as long as may be desired or necessary to thoroughly remove any of the soluble and virulent toxins.

A convenient test to determine whether or not the virulent toxins have been sufficiently removed is afforded by concentrating the last wash water, by evaporation or otherwise, to about one twentieth of its volume and then injecting about 10 cubic centimeters of the same into the abdominal cavity of a guinea pig. If there is no resulting indication of tuberculin reaction then it is known that the soluble and virulent toxins have been thoroughly removed. The residue is now permitted to settle and as much of the water as possible drawn off. To the residuum is now added concentrated sulfuric or other mineral acid in about the proportion of ten parts of acid to one of the residuum. The acid attacks and completely dissolves the cell structure of the bacilli, thereby liberating and dissolving the inner toxin contained in walls or structure of the cells and which does not possess virulent or noxious properties but does possess in a remarkable degree therapeutic properties and is valuable as a remedy for tuberculosis or for use in preparations for treating said disease, and the recovery and utilization of this non-virulent toxin of the tubercle bacilli cell structure, or inner toxin, as it may be called, is the object and purpose sought in carrying out my present invention.

After a thorough dissolution of the cell structures of the bacilli has been effected by the acid, as above described, water is added to the solution in about the proportion of twenty parts of water to one of the acid solution, and the whole is set aside for about twenty-four hours, during which time a voluminous precipitate will deposit. This precipitate is then filtered and thoroughly washed with water to remove the sulfuric acid. Any noxious or virulent toxins remaining in the mass at the time the sulfuric or other acid is added are attacked and converted by the acid into a solution which is not virulent in character, or else the virulent toxins remain in solution while the non-virulent toxin, the recovery of which is the object sought, precipitates, as above explained, the latter thereby being finally and completely separated from the virulent toxin and recovered by filtration, decantation or otherwise. This precipitate, obtained as above described, and which contains the non-virulent toxin possessing the therapeutic property which is sought for, is next dissolved in a caustic soda solution of about .1% strength, and in about the proportion of 100 cc. of the caustic soda solution to 1 gram of the dried mass, thereby producing a brown transparent solution. If desired, and preferably, this solution may be neutralized in any desired way as, for instance, by means of hydrochloric acid. To render the solution antiseptic, carbolic acid may be added thereto in about the proportion of one part of carbolic acid to two hundred parts of the solution.

The greatest care should be exercised in carrying out the various steps of the process and particularly the step of dissolving the bacilli with sulfuric acid. The acid should be added gradually and the duration of steeping and washing after the bacilli are thoroughly dissolved should be carefully regulated so as to prevent too great or too little modification of the inner or cellular toxin. If the modification progresses beyond the required or desired point the product will be impotent or too weak in therapeutic property. On the other hand, if the modification does not advance to the proper stage or limit, the virulent properties of the bacilli will not be eliminated and hence the resulting product will be unfit for practical use.

Various tests may be employed to determine the proper action of the acid. This may be accomplished by microscopical examinations of the substance, or and preferably, I inject ten cubic centimeters of the solution into the abdominal cavity of two or more tuberculous guinea pigs which have been previously infected. If no special reaction takes place then it is known that the solution is of proper character. In case tuberculin reaction appears further purification and treatment with sulfuric acid is necessary. Another test is afforded by injecting five tenths of a cubic centimeter of the solution every other day near the swollen groin of a tuberculous guinea-pig for several days and if no noticeable change of the body temperature takes place, or if the subject does not appear in any way enfeebled, then one and one tenth cubic centimeters of the solution is injected every other day until ten injections are administered. If the swelling of the groin decreases then the solution is known to be effective.

In the use of sulfuric acid to dissolve the cell structures and to convert the virulent toxins, any fat, ethereal or other volatile oils, which are difficult of absorption when injected in a patient, are set free in the acid solution, and rising to the top, may be readily removed, thereby leaving the ultimate product not only completely separated from the virulent and noxious toxins but also free from oils and fats.

A precipitate obtained from the solution as above described, by the addition thereto of alcohol or an acid, either organic or inorganic, has the appearance of nucleic acid of the bacilli except that it contains neither phosphorus nor sulfur. This indicates that the product which I obtain by the process described is a modified form of nucleic acid.

I have found that when the solution, obtained as herein described, is injected into the human body or into the body of an animal, no local irritation is produced at the point where the injection is made, and no side reactions, such as increase or elevation of the temperature, results from the injection but that the solution is readily absorbed and assimilated and possesses efficacy in arresting the development and progress of tuberculosis, or entirely cures it, and, if injected into a healthy body or animal, it generates a preventative power against living tubercle bacilli, and consequently constitutes an immunization agent against such bacilli.

In the use of the tuberculo-toxoidin of my invention and as doses thereof for use on human beings I have found five different dilutions to be effective as follows:

(a) One part of the toxoidin to sixteen parts of distilled water. This is used at the beginning of the treatment, 0.1 c.c. thereof being hypodermically injected, and after 48 hours from the first injection 1.0 c.c. of the same dilution is injected.

(b) One part of the toxoidin to eight parts of distilled water. This is the next dose, 0.6 c.c. thereof being injected, and 48 hours thereafter an injection of 1.0 c.c. of the same dilution is made.

(c) One part of the toxoidin to four parts of distilled water, of which 0.6 c.c. is injected after an interval of 48 hours from the previous injection, and 48 hours thereafter another injection of 1.0 c.c. of the same dilution is made.

(d) One part of the toxoidin to two parts of distilled water, of which 0.6 c.c. is injected after an interval of 48 hours from the previous injection, the quantity being increased by 0.1 c.c. at regular intervals of 48 hours until an injection of 1.0 c.c. is attained.

(e) Thereafter the undiluted toxoidin is injected at regular intervals of 48 hours commencing with 0.6 c.c. and increasing by 0.1 c.c. until 1.0 c.c. is reached.

If the body temperature of the patient does not rise above 37.5° C. and general symptoms of improvement appear, and an increase of the opsonins in the blood is observed, then it is known that the toxoidin is effective.

If desired tuberculo-toxoidin may be employed in the production of serum, in the ordinary manner of serum production, for use and with enhanced value as serum over that produced by employing other agents, and the animals employed for such purpose, I have found, become immune much earlier and much more perfectly than when other preparations are employed.

Having now set forth the object and nature of my invention and the method of carrying the same into practical operation, what I claim as new and useful and of my own invention and desire to secure by Letters Patent is:—

1. In the manufacture of tuberculo-toxoidin, the process which consists in dissolving in water the soluble portions of a mass of tubercle bacilli, then washing and drying the residue, then dissolving the dried residue in acid, and finally precipitating the acid solution.

2. In the manufacture of tuberculo-toxoidin, the process which consists in triturating tubercle bacilli, then washing the triturated mass in water to extract and remove the soluble constituents thereof, then dissolving the residue with mineral acid, then precipitating the solution, and finally washing and dissolving the precipitate.

3. In the manufacture of tuberculo-toxoidin, the process which consists in triturating tubercle bacilli, then washing the triturated mass in water to extract and remove the soluble constituents thereof, then dissolving the residue with sulfuric acid, then precipitating the solution, and finally washing and dissolving the precipitate.

4. In the manufacture of tuberculo-toxoidin, the process which consists in triturating tubercle bacilli, then washing the triturated mass in water to extract and remove the soluble constituents thereof, then dissolving the residue with a mineral acid, then precipitating the solution, then washing the precipitate and finally dissolving the precipitate in a weak aqueous alkaline solution.

5. In the manufacture of tuberculo-toxoidin, the process which consists in triturating tubercle bacilli, then steeping the triturated mass in water to extract and remove the soluble portions thereof, then washing and drying the residue, then dissolving the residue in acid, and precipitating the solution, to remove the acid, then washing and dissolving the precipitate, then neutralizing the resulting solution and finally adding an antiseptic thereto.

6. The process of producing tuberculo-toxoidin which consists in dissolving in water the soluble constituents of a mass of tubercle bacilli cells, then dissolving in acid the cell structure of the residue, and finally precipitating the acid solution.

In witness whereof, I have hereunto set my hand this twentieth day of October, 1906, in the presence of the subscribing witnesses.

TORU ISHIGAMI.

Witnesses:
TAKESHI MATSUDA,
SUEZO AKAHOSHI.

---

Copies of this patent may be obtained for five cents each, by addressing the "Commissioner of Patents, Washington, D. C."